Jan. 21, 1969　　　B. N. SVENSON　　　3,422,839
FIREHOSE CLAMP

Filed Oct. 31, 1966　　　Sheet _1_ of 2

INVENTOR
BERT N. SVENSON
BY
ATTORNEYS

INVENTOR
BERT N. SVENSON

United States Patent Office 3,422,839
Patented Jan. 21, 1969

3,422,839
FIREHOSE CLAMP
Bert N. Svenson, Norwalk, Calif., assignor to Potter-Roemer, Inc., Los Angeles, Calif., a corporation of California
Filed Oct. 31, 1966, Ser. No. 590,837
U.S. Cl. 137—355.18   1 Claim
Int. Cl. A62c 35/20; F16l 3/00; F16l 55/14

ABSTRACT OF THE DISCLOSURE

A firehose clamp of the kind which prevents the entry of water into a length of folded emergency hose before the entire length has been withdrawn from its storage position and which releases automatically when tension is applied to the hose. The clamp includes two clamp parts between which the hose is clamped and one of said parts being hinged to swing to a released position when it is engaged by the hose as it is being withdrawn.

---

It is common practice to store firehose for emergency use in a cabinet or against a wall. The hose is conventionally folded back and forth upon itself to provide a generally rectangular bundle. One end of the hose is attached to a valve on a water supply line and the other end is provided with a nozzle. When it is necessary to use the hose, the valve is first opened and then the hose is grasped at the nozzle end and withdrawn from its storage position. It is difficult and sometimes dangerous to handle a hose as it is being charged with water under high pressure and the water might prevent its ready removal from the storage position. Consequently it is required by the Underwriters' Laboratory that some means be employed to clamp the hose or otherwise prevent water from charging its entire length before it is removed from the storage position.

The present invention accomplishes this with a clamp disposed within the cabinet and engaging the hose at a folded portion thereof. The clamp is designed to open when the hose is placed under tension but will not open because of water pressure in the hose.

It is the object of the present invention to provide an improved hose clamp which is relatively simple and inexpensive in construction but acts positively as a clamping means and also releases quickly, completely and without danger of failure under the proper circumstances.

It is also an object to provide a clamp that cannot be opened prematurely by the pressure of water within the hose adjacent the clamp.

Further and more specific objects and advantages of the invention and the manner in which it is carried into practice are made apparent in the following specification wherein the invention is described in detail by reference to the accompanying drawing.

Figure 1:
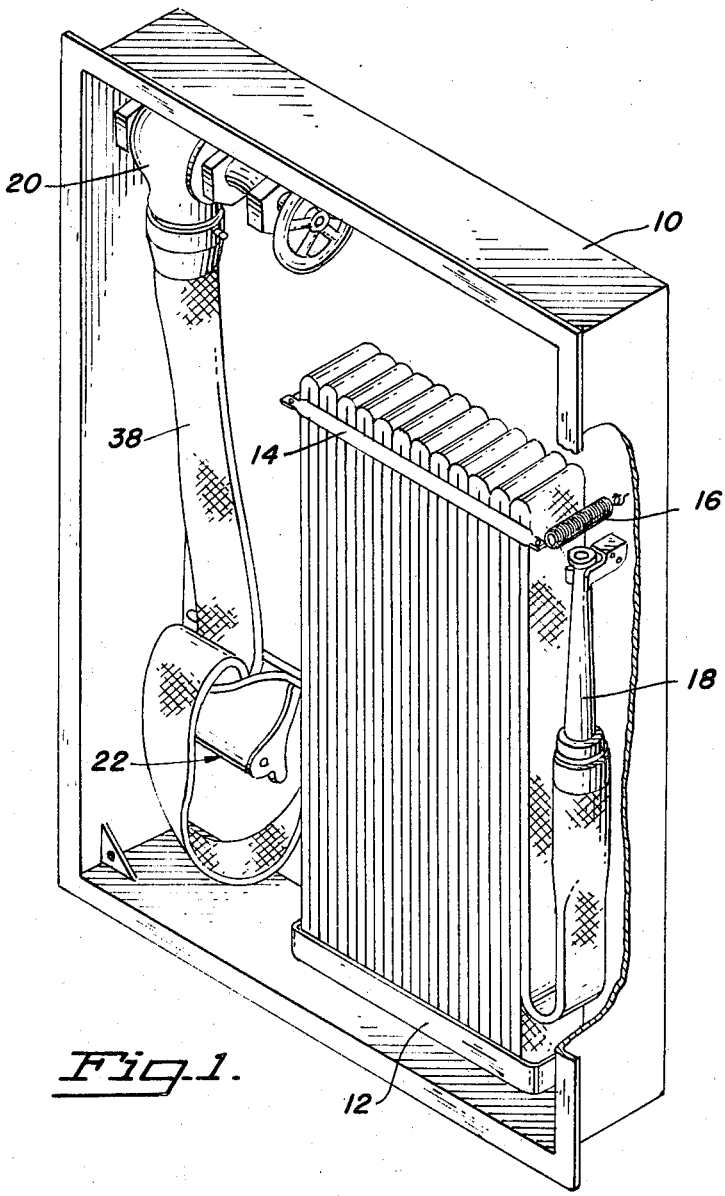
FIG. 1 is a perspective view of a fire hose cabinet containing a hose and a clamp embodying the present invention.

In FIG. 1, a housing shown at 10 contains a length of hose repeatedly folded upon itself to form a bundle which is received at its lower end within a tray 12 and temporarily retained at its upper end by a bar 14 held against the hose by a pair of springs, one of which is shown at 16 and which extend between the bar and the back wall of the housing. A nozzle 18 is fastened to one end of the hose and the opposite end of the hose is secured to the outlet of a valve 20 which controls the flow of water under pressure through a line (not shown).

Figure 2:
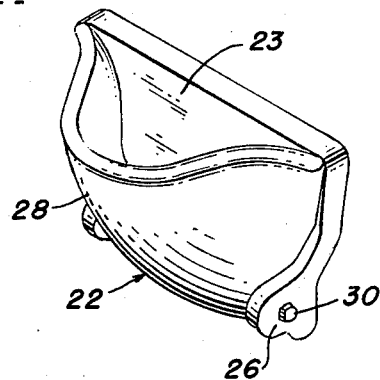
FIG. 2 is a perspective view of the clamp only showing it removed from the cabinet.
Figure 3:
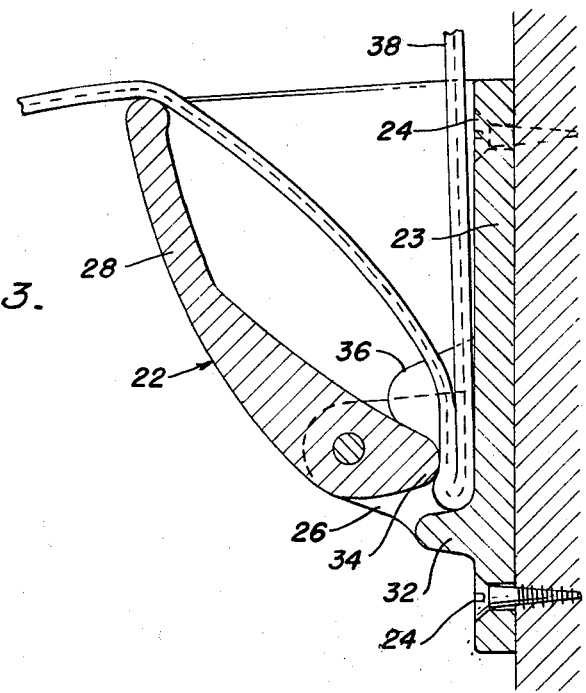
FIG. 3 is an enlarged central vertical sectional view through the clamp illustrating the manner in which a piece of hose is clamped therein.

The clamp of the present invention is generally indicated at 22 and best illustrated in FIGS. 2 and 3. In the last figure, the clamp is shown as having a stationary clamp plate 23 adapted to be secured against the back wall of the housing as by screws which pass through suitable holes shown at 24. The plate 23 has a pair of spaced forwardly extending ears 26 between which a second clamp plate 28 is pivotally supported as by a pin 30. The plate 23 has a clamping edge 32 extending forwardly therefrom and a cooperating clamping edge 34 is formed as an extension of the plate 28 inwardly of the pivot 30. Two ears, one of which is shown at 36 in FIG. 3, are spaced apart a distance comparable to the width of the hose and hold the hose in a central position to be certain that it is disposed between the clamping edges 32 and 34. A portion of the hose shown at 38 which is just below the valve 20 in FIG. 1 is lead downwardly and then upwardly to provide a reverse bend securely clamped between the edges 32 and 34. The hose is thus positioned while the plate 28 is swung downwardly and its clamping edge 34 moved upwardly and outwardly away from the edge 32. Upon upward movement of the plate 28, the fold in the hose is tightly pressed between the two clamping edges so that water entering upon opening of the valve is prevented from passing this point. As may be observed in both FIGS. 2 and 3, the clamping plate 28 is of concave shape providing a large space between itself and the plate 23. This is to accommodate enlargement of the hose as the water enters it. Without the space provided by the shape of plate 28 such enlargement could cause engagement of the plate 28 and outward movement thereof to release the clamp.

In operation when the hose is needed it is grasped by the nozzle and withdrawn from the cabinet, its withdrawal being facilitated by the resilient securing means 14–16 adjacent its upper end. As the hose is fully withdrawn and becomes taut between the nozzle and the clamp, pressure of the hose against the upper edge of the plate 28 causes the plate to swing outwardly and its inner edge 34 to swing upwardly releasing the hose and permitting the water under pressure to reach the nozzle.

I claim:
1. A clamp for firehose comprising a first clamp plate adapted to be secured against a surface near a valve, a second clamp plate pivoted to the first and having a clamping part movable to and away from the first, a hose extending from the valve, means supporting the hose for emergency use, a portion of the hose between the valve and the supporting means being doubled back upon itself, the doubled portion of the hose being clamped between said clamping parts with a part of the hose leading to the supported section disposed over an edge of the second clamp plate in a position to impart pivotal movement and release of the clamped hose in response to a pulling force on the hose, said pivot and clamp parts being adjacent the lower part of the plates and parts of the hose on both sides of the clamp parts being disposed between the plates, means projecting from one plate to center the hose in the clamp, and one plate being shaped to provide sufficient space between the plates to prevent water in the hose from releasing the clamp.

References Cited

UNITED STATES PATENTS

| 1,032,664 | 7/1912 | France. | |
| 1,500,907 | 7/1924 | Tucker | 24—248 XR |
| 1,576,210 | 3/1926 | Nickson. | |
| 2,719,752 | 10/1955 | Dodge et al. | 137—355.18 |
| 2,756,101 | 7/1956 | Cauffman | 137—355.18 |
| 2,993,503 | 7/1961 | Pofryfke et al. | 137—355.18 |

CHANCELLOR E. HARRIS, *Primary Examiner.*

ROBERT P. SEITTER, *Assistant Examiner.*

U.S. Cl. X.R.

251—9; 248—90; 24—248